United States Patent
Kikuchi et al.

(10) Patent No.: US 11,633,859 B2
(45) Date of Patent: Apr. 25, 2023

(54) ROBOT

(71) Applicant: FANUC CORPORATION, Yamanashi (JP)

(72) Inventors: Kaname Kikuchi, Yamanashi (JP); Tomoyuki Motokado, Yamanashi (JP); Toshihiko Inoue, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 172 days.

(21) Appl. No.: 17/000,633

(22) Filed: Aug. 24, 2020

(65) Prior Publication Data

US 2021/0114217 A1    Apr. 22, 2021

(30) Foreign Application Priority Data

Oct. 18, 2019    (JP) .............................. JP2019-190855

(51) Int. Cl.
*B25J 9/16*    (2006.01)
*B25J 19/00*    (2006.01)
*B25J 9/04*    (2006.01)
*B25J 9/10*    (2006.01)

(52) U.S. Cl.
CPC .......... *B25J 9/1674* (2013.01); *B25J 19/0066* (2013.01); *B25J 9/046* (2013.01); *B25J 9/102* (2013.01)

(58) Field of Classification Search
CPC ................ B25J 19/0066; B25J 9/1674; G05B 2219/32234; G05B 2219/37209
See application file for complete search history.

(56) References Cited

U.S. PATENT DOCUMENTS

| | | | | | |
|---|---|---|---|---|---|
| 5,424,960 | A | * | 6/1995 | Watanabe | G01R 31/343 702/41 |
| 8,336,420 | B2 | * | 12/2012 | Carter | B25J 17/0275 901/27 |
| 9,895,806 | B2 | * | 2/2018 | Harada | B25J 9/1679 |
| 10,606,238 | B2 | * | 3/2020 | Etou | G05B 19/406 |

(Continued)

FOREIGN PATENT DOCUMENTS

JP    S62-140786 A    6/1987
JP    2013-249027 A    12/2013

(Continued)

*Primary Examiner* — Khoi H Tran
*Assistant Examiner* — Rodney P King
(74) *Attorney, Agent, or Firm* — Maier & Maier, PLLC

(57) ABSTRACT

A robot including a robot mechanism including joints and drive units, a control unit controlling the drive units so that an inspection operation to inspect one target drive unit among the drive units is executed by the robot mechanism, and a notification unit notifying maintenance information of the target drive unit based on a current value of a motor of the target drive unit during the inspection operation, or on information associated with the current value, and the inspection operation includes transmitting, to the motor of the target drive unit, control command to rotate a joint as much as a predetermined rotation angle, and thereby moving a tip of the robot mechanism or a tool at the tip, close to an object at a predetermined position from a predetermined start position, to press the object, and separating the tip of the robot mechanism or the tool away from the object.

8 Claims, 11 Drawing Sheets

(56) References Cited

U.S. PATENT DOCUMENTS

| | | | |
|---|---|---|---|
| 10,882,183 B2* | 1/2021 | Nakata | G05B 19/404 |
| 11,167,414 B2* | 11/2021 | Yokoyama | B25J 9/1694 |
| 11,241,793 B2* | 2/2022 | Yamashita | B25J 9/126 |
| 2016/0039092 A1 | 2/2016 | Harada et al. | |
| 2016/0279794 A1 | 9/2016 | Inagaki et al. | |
| 2017/0031329 A1 | 2/2017 | Inagaki et al. | |
| 2019/0265657 A1 | 8/2019 | Inagaki et al. | |
| 2021/0229282 A1* | 7/2021 | Tanaka | B25J 9/163 |

FOREIGN PATENT DOCUMENTS

| | | |
|---|---|---|
| JP | 5890488 B1 | 3/2016 |
| JP | 2016-179527 A | 10/2016 |
| JP | 2017-033526 A | 2/2017 |
| JP | 2017-077602 A | 4/2017 |
| JP | 2017-120649 A | 7/2017 |
| JP | 2018-073327 A | 5/2018 |

* cited by examiner

ROBOT

CROSS-REFERENCE TO RELATED APPLICATIONS

This application claims the benefit of Japanese Patent Application No. 2019-190855, the content of which is incorporated herein by reference.

FIELD

The present invention relates to a robot.

BACKGROUND

Heretofore, gears have been used in drive units of various machines. Backlash of each of the gears might increase with use of the machine for a long period of time. To solve this problem, a method of measuring the backlash of the gear is suggested (e.g., see Japanese Unexamined Patent Application, Publication No. Sho 62-140786; Japanese Unexamined Patent Application, Publication No. 2013-249027; and Japanese Unexamined Patent Application, Publication No. 2018-073327).

SUMMARY

An aspect of the present disclosure provides a robot including a robot mechanism including a plurality of joints and a plurality of drive units that drive the plurality of joints, respectively, a control unit that controls the plurality of drive units so that a predetermined inspection operation to inspect a target drive unit is executed by the robot mechanism, the target drive unit being one drive unit including a motor and a gear, among the plurality of drive units, and a notification unit that notifies maintenance information on maintenance of the target drive unit, the maintenance information being based on a current value of the motor of the target drive unit during the predetermined inspection operation, or on information associated with the current value, wherein the predetermined inspection operation includes an operation of transmitting, to the motor of the target drive unit, control command to rotate a target joint that is the joint to be driven by the target drive unit as much as a predetermined rotation angle, and thereby moving a tip of the robot mechanism or a tool connected to the tip close to an object at a predetermined position from a predetermined start position, to press the object, and an operation of separating the tip of the robot mechanism or the tool away from the object.

DETAILED DESCRIPTION OF EMBODIMENTS

Description will be made as to a robot 10 according to an embodiment of the present disclosure with reference to the drawings.

Figure 1:
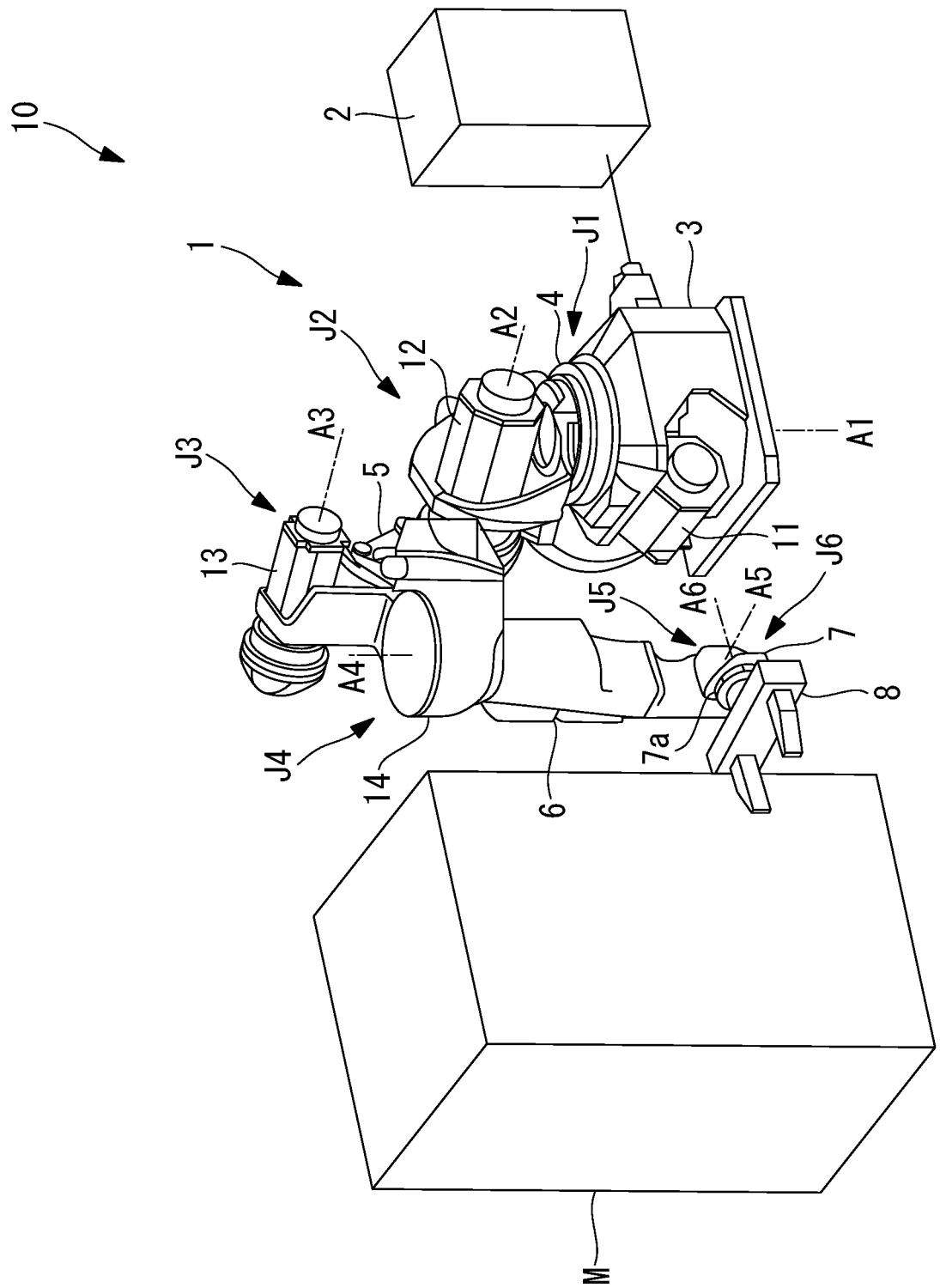
FIG. 1 is an overall configuration view of a robot according to an embodiment, explaining an example of an inspection operation of a drive unit for a fourth joint.
Figure 2:
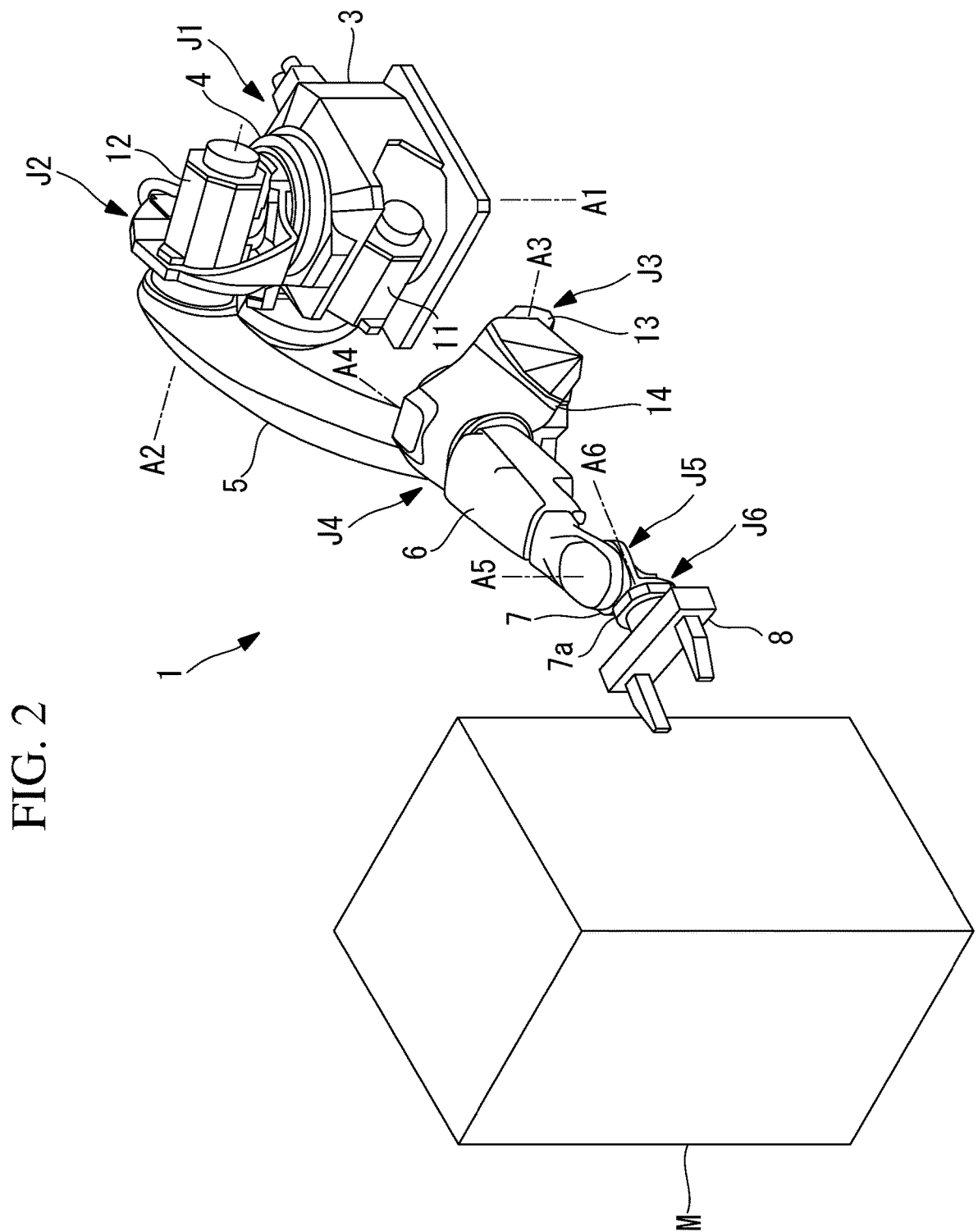
FIG. 2 is a view explaining an example of an inspection operation of a drive unit for a fifth joint of the robot of FIG. 1.
Figure 3:
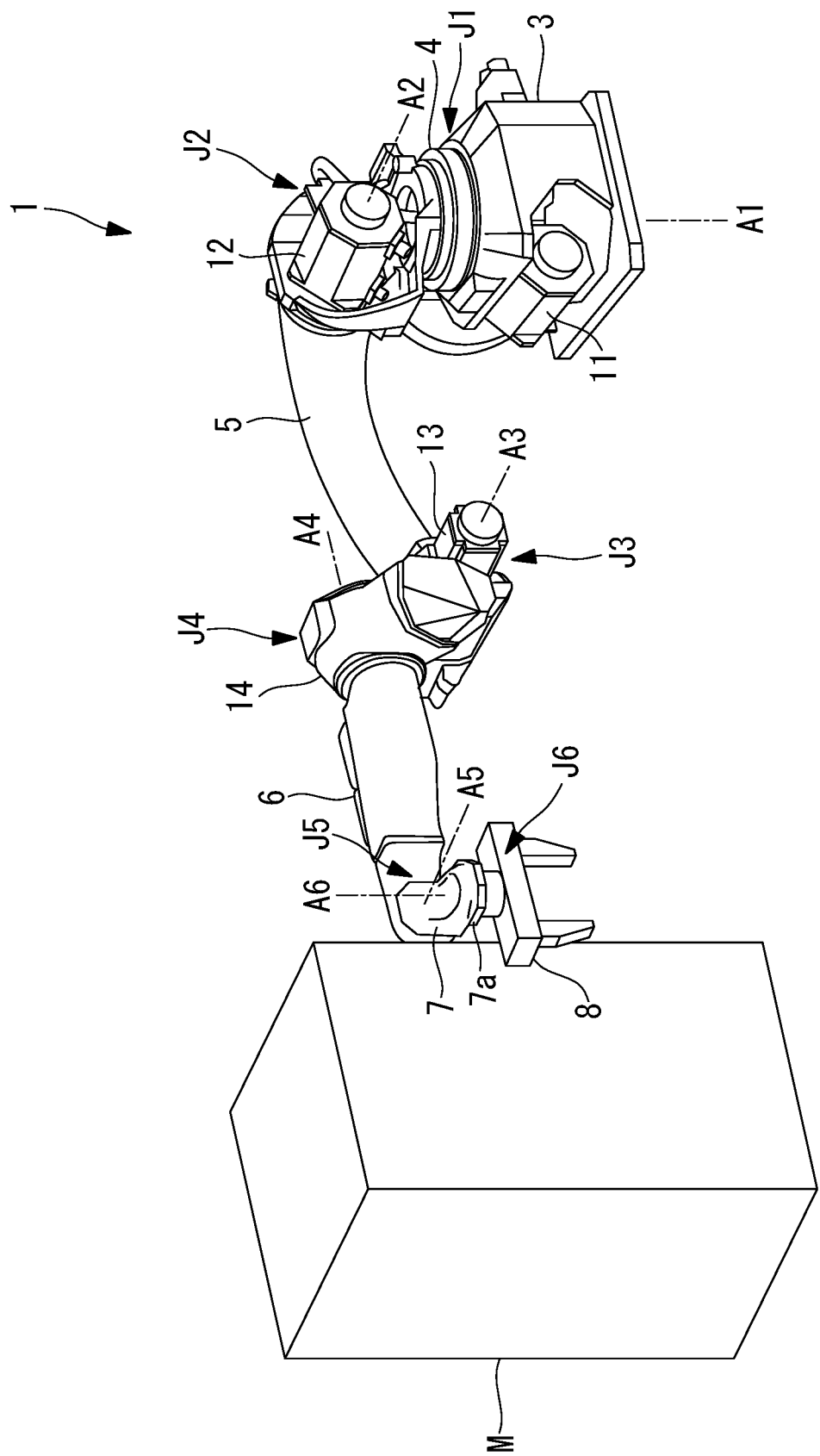
FIG. 3 is a view explaining an example of an inspection operation of a drive unit for a sixth joint of the robot of FIG. 1.

As shown in FIG. 1 to FIG. 3, the robot 10 includes a robot mechanism 1, and a control device 2 connected to the robot mechanism 1. In FIG. 2 and FIG. 3, the control device 2 is not shown.

The robot mechanism 1 is a 6-axis vertical articulated robot including six joints J1, J2, J3, J4, J5 and J6. Specifically, the robot mechanism 1 includes a base 3, a swivel body 4, a first arm 5, a second arm 6 and a wrist unit 7, and a tool 8 is attached to a flange part 7*a* of the wrist unit 7. Furthermore, the robot mechanism 1 includes six drive units 11, 12, 13, 14, 15 and 16 that rotate and drive the joints J1, J2, J3, J4, J5 and J6, respectively. The drive units 15 and 16 are provided inside the second arm 6 and the wrist unit 7.

The base 3 is fixed to a floor. The swivel body 4 is disposed on the base 3, and coupled to the base 3 via the first joint J1. By rotation of the first joint J1, the swivel body 4 rotates with respect to the base 3 about a first axis A1 in a vertical direction. The first arm 5 is coupled to the swivel body 4 via the second joint J2. By rotation of the second joint J2, the first arm 5 rotates with respect to the swivel body 4 about a horizontal second axis A2.

The second arm 6 is coupled to a tip of the first arm 5 via the third joint J3 and the fourth joint J4. By rotation of the third joint J3, the second arm 6 rotates with respect to the first arm 5 about a third axis A3 that is parallel to the second axis A2. By rotation of the fourth joint J4, the second arm 6 rotates with respect to the first arm 5 about a fourth axis A4 that is a longitudinal axis of the second arm 6.

The wrist unit 7 is coupled to a tip of the second arm 6 via the fifth joint J5. By rotation of the fifth joint J5, the wrist unit 7 rotates with respect to the second arm 6 about a fifth axis A5 that is orthogonal to the longitudinal axis of the second arm 6. The flange part 7*a* is supported by the wrist unit 7 via the sixth joint J6. By rotation of the sixth joint J6, the flange part 7*a* rotates with respect to the second arm 6 about a sixth axis A6 that is orthogonal to the fifth axis A5.

Figure 4:
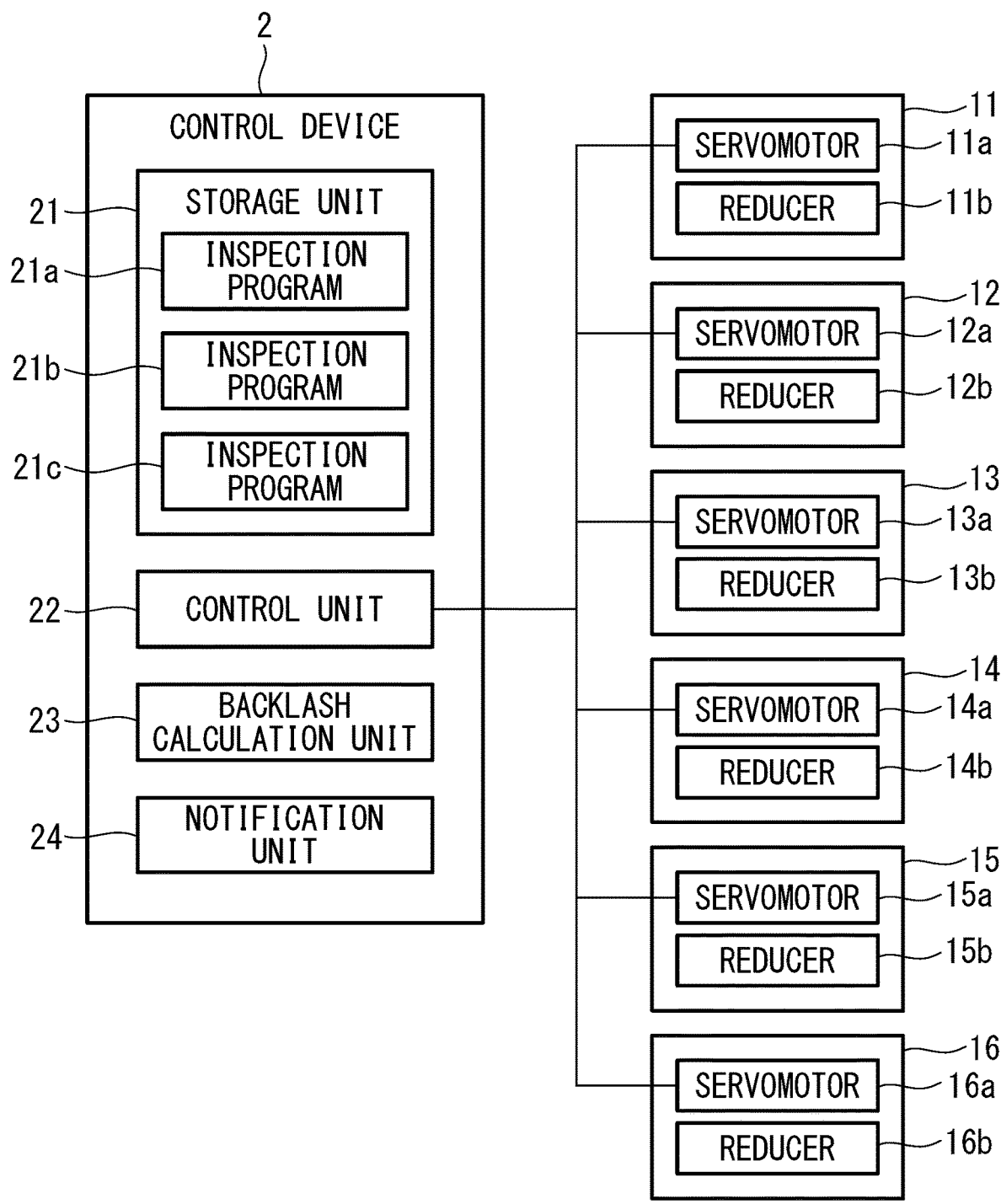
FIG. 4 is a functional block diagram of a control device of the robot of FIG. 1.

As shown in FIG. 4, the drive units 11, 12, 13, 14, 15 and 16 include servomotors 11*a*, 12*a*, 13*a*, 14*a*, 15*a*, and 16*a*, and reducers 11*b*, 12*b*, 13*b*, 14*b*, 15*b*, and 16*b* that reduce speed of rotation of each of the servomotors 11*a*, 12*a*, 13*a*, 14*a*, 15*a*, and 16*a*, respectively. Among the reducers 11*b*, 12*b*, and 13*b* for three joints J1, J2, and J3 on a proximal side, at least the reducer 11*b* is a precision reducer with no or almost no gear backlash, and, for example, RV reducer (registered trademark). The reducers 12b and 13b may also be precision reducers.

Each of the reducers 14b, 15b and 16b for three joints J4, J5 and J6 on a tip side is a gear reducer including a plurality of gears that mesh with each other. For example, each of the reducers 14b, 15b and 16b includes hypoid gears including an input hypoid gear and an output hypoid gear that mesh with each other. Each output hypoid gear is a ring gear disposed coaxially with the axis A4, A5 or A6, and fixed to the second arm 6, the wrist unit 7 or the flange part 7a. Rotational force of the servomotor 14a, 15a or 16a is input into each input gear. Each of the reducers 14b, 15b and 16b may include another type of gear generally for use as the reducer in place of the hypoid gear.

As shown in FIG. 4, the control device 2 includes a storage unit 21, a control unit 22, a backlash calculation unit 23, and a notification unit 24. The storage unit 21 includes a RAM, a ROM and any other storage device. The storage unit 21 stores inspection program to inspect the reducer of a target drive unit. The target drive unit is one drive unit including gears among six drive units 11 to 16.

In the present embodiment, the storage unit 21 stores an inspection program 21a for the reducer 14b, an inspection program 21b for the reducer 15b, and an inspection program 21c for the reducer 16b, and the target drive unit is selected from three drive units 14, 15, and 16 including the gear reducers 14b, 15b, and 16b.

The control unit 22 includes a processor such as a CPU. The control unit 22 transmits, to the servomotors 11a to 16a, control command to control the servomotors 11a to 16a, and thereby controls rotating operations of the joints J1 to J6.

The control unit 22 controls the servomotors 11a to 16a in accordance with the inspection program 21a, so that a predetermined inspection operation to inspect the reducer 14b is executed by the robot mechanism 1. The control unit 22 controls the servomotors 11a to 16a in accordance with the inspection program 21b, so that a predetermined inspection operation to inspect the reducer 15b is executed by the robot mechanism 1. The control unit 22 controls the servomotors 11a to 16a in accordance with the inspection program 21c, so that a predetermined inspection operation to inspect the reducer 16b is executed by the robot mechanism 1. These predetermined inspection operations are executed periodically, e.g., once a week in accordance with user's instruction or a preset schedule.

Figure 5:
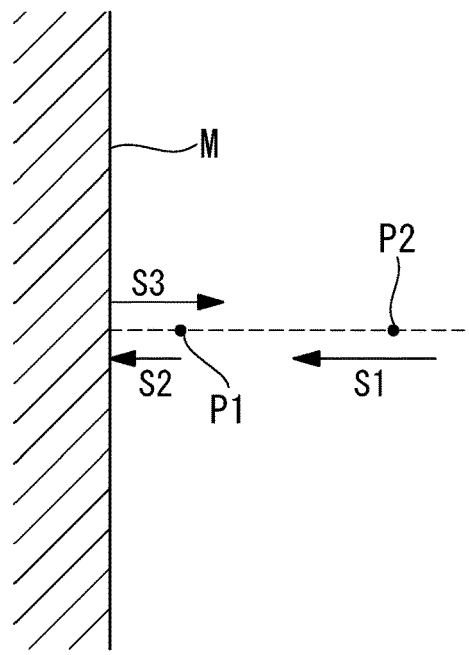
FIG. 5 is a view explaining movement of a tool during the inspection operation.

As shown in FIG. 5, the predetermined inspection operation includes an approaching operation, a pressing operation, and a separating operation. Arrows S1, S2 and S3 indicate movements of the tool 8 in the approaching operation, the pressing operation and the separating operation, respectively. In the inspection operation, the tool 8, and a predetermined object M disposed around the robot mechanism 1 are for use. In the inspection operation, the tool 8 is pressed onto the object M as described later.

The tool 8 may be a tool for an operation such as gripping or processing of a workpiece, or a tool exclusive for the inspection operation. To enable inspection of the reducers 14b, 15b and 16b, the tool 8 has a contact point or a contact surface that comes in contact with the object M, at a position offset from the sixth axis A6 in a direction orthogonal to the sixth axis A6. The object M is a tough structure, for example, a pedestal that is not deformed or displaced when pressed with the tool 8. The object M is fixed to the floor, and disposed at a predetermined position to the base 3.

In the approaching operation, the control unit 22 operates the robot mechanism 1 to dispose the tool 8 at a predetermined via-position P2 opposite to a predetermined start position P1 on an object M side. The predetermined start position P1 is a position where the tool 8 is slightly away from the object M, and a gap between the object M and the tool 8 at the start position P1 is, for example, several hundreds of micrometers. At this time, the robot mechanism 1 is disposed with a posture so that the tool 8 passes through the start position P1 and moves toward the object M by rotating the target joint. The target joint is a joint to be driven by the target drive unit, and is one of the joints J4, J5, and J6 in the present embodiment. Next, the control unit 22 rotates the target joint so that the tool 8 approaches from the via-position P2 opposite to the object M to the start position P1.

As a result of the approaching operation, backlash in the mutually meshing gears of the reducer 14b, 15b or 16b of the target drive unit becomes in a predetermined state. That is, tooth surfaces of the gears come in contact with each other on one side in a gear rotating direction, and the backlash is formed only on the other side in the gear rotating direction.

Next, in the pressing operation, the control unit 22 transmits, to the servomotor 14a, 15a or 16a of the target drive unit, control command to rotate the target joint as much as a predetermined rotation angle at a constant speed. Consequently, the control unit 22 rotates only the target joint, and moves the tool 8 close to the object M from the predetermined start position P1, to press the tool 8 onto the object M. The predetermined rotation angle corresponds to, for example, several tens of minutes.

Figure 6:
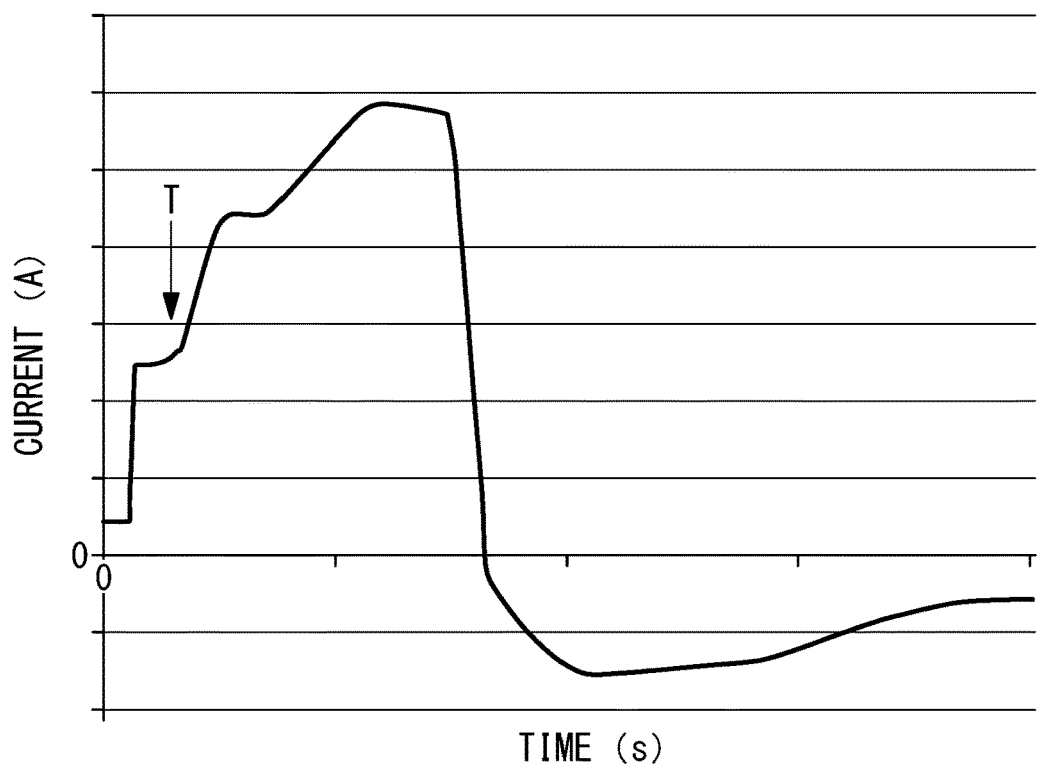
FIG. 6 is a graph showing an example of change over time in current value of a servomotor of a target drive unit during the inspection operation.

FIG. 6 shows an example of change over time in current value of the servomotor of the target drive unit during the predetermined inspection operation. The rotation of the target joint starts, and then the tool 8 comes in contact with the object M before the rotation angle of the target joint reaches the predetermined rotation angle. The tool 8 comes in contact with the object M, and then, as shown in FIG. 6, the tool 8 is to be further moved against force from the object M. Consequently, the current value of the servomotor 14a, 15a or 16a of the target drive unit gradually increases, and pressing force of the tool 8 onto the object M gradually increases. Next, in the separating operation, the control unit 22 rotates the target joint in reverse to separate the tool 8 from the object M.

The backlash calculation unit 23 monitors the current value of the servomotor 14a, 15a or 16a of the target joint during the predetermined inspection operation. Between a backlash amount and the current value during the predetermined inspection operation, there is a predetermined relation that the larger the backlash amount is, the smaller a maximum value of the current value becomes. Based on this predetermined relation, the backlash calculation unit 23 calculates, from the maximum value of the current value, the backlash amount of the gear of the reducer 14b, 15b or 16b of the target drive unit.

Figure 7:
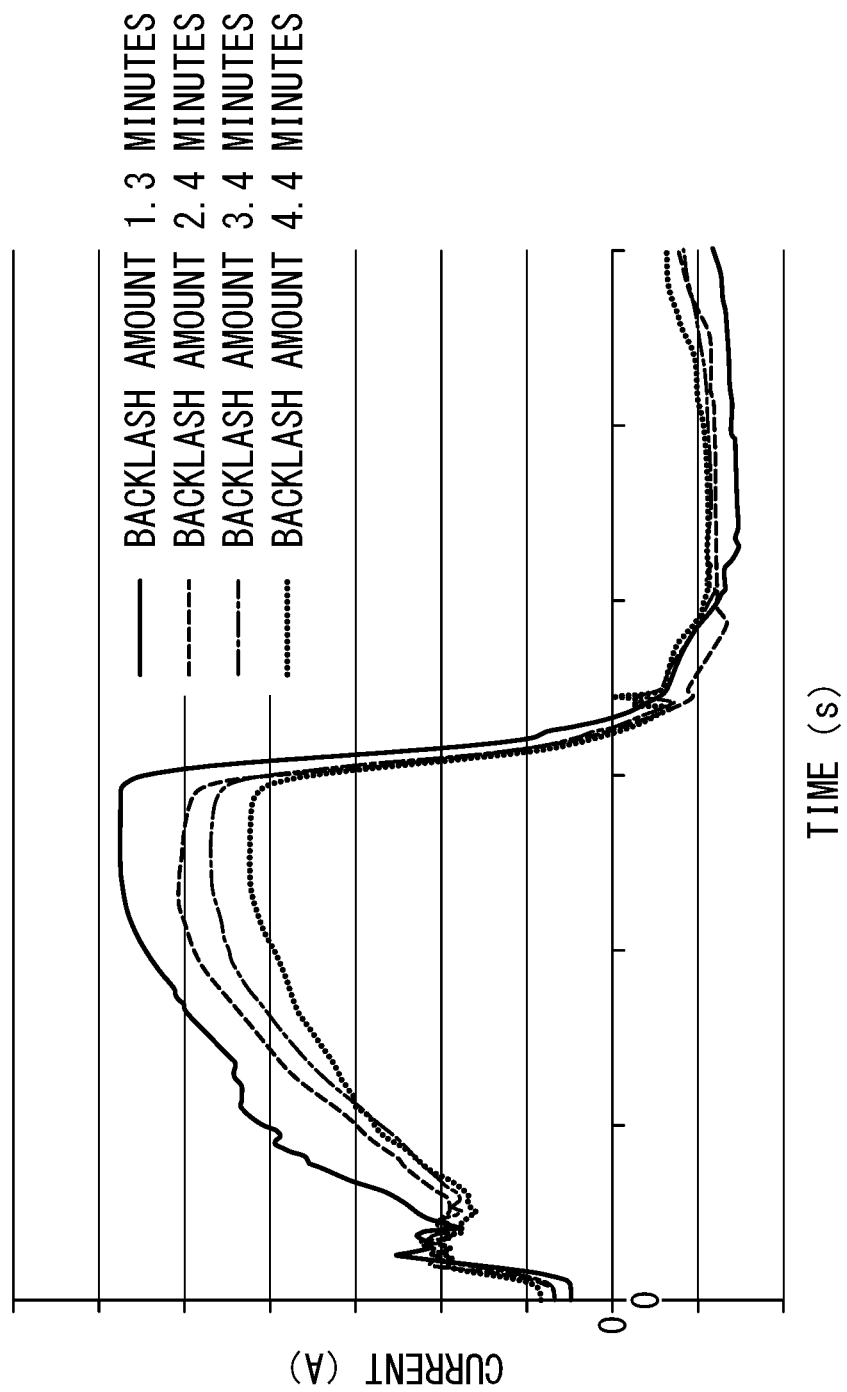
FIG. 7 is a graph showing change over time in current value of a servomotor of each of a plurality of drive units having different backlash amounts during the inspection operation.
Figure 8:
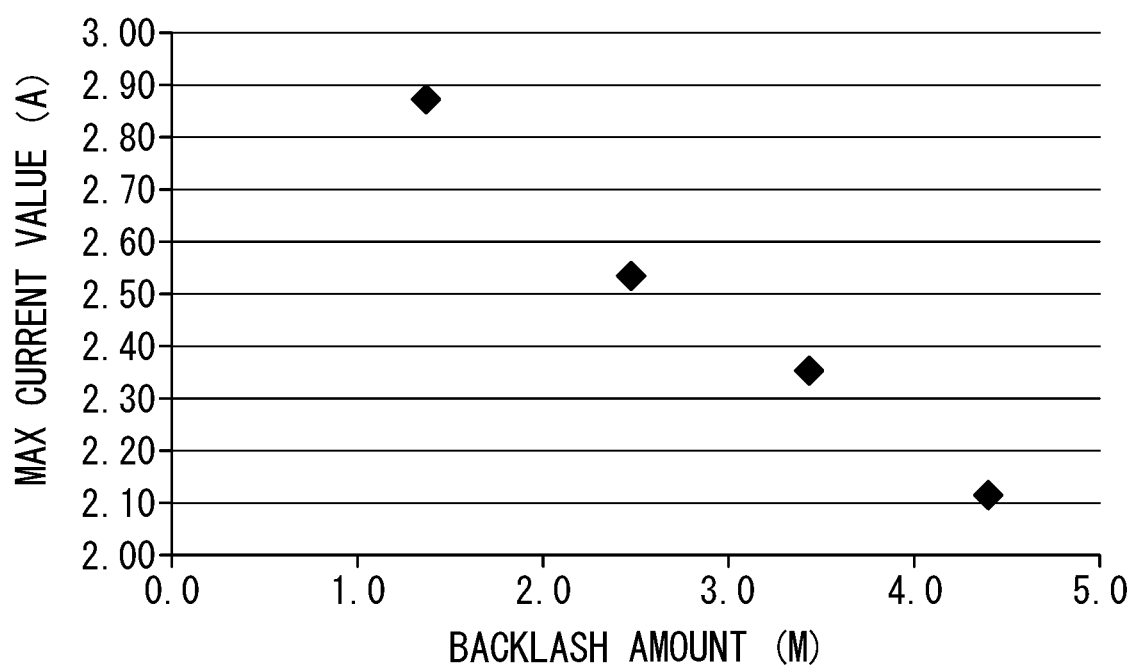
FIG. 8 is a correlation diagram between the backlash amount and a maximum current value of the servomotor.

FIG. 7 shows a result of an experiment in which the current value of the servomotor during the predetermined inspection operation is measured, as to a target drive unit having a different backlash amount of the reducer. In the experiment of FIG. 7, the target drive unit is the drive unit for the fifth joint J5, and a predetermined rotation angle of the fifth joint J5 in the pressing operation is 0.3°. FIG. 8 is a correlation diagram between the maximum value of the current value of the servomotor and the backlash amount obtained from the graph of the current value of FIG. 7. As shown in FIG. 7 and FIG. 8, the larger the backlash amount is, the smaller the maximum value of the current value becomes. This is because as the backlash amount increases, timing T at which the current value rises (see FIG. 6) delays, and consequently, final pressing force of the tool 8 onto the object M decreases.

The notification unit 24 notifies an operator of maintenance information based on the backlash amount calculated by the backlash calculation unit 23. The maintenance information is information on maintenance of the target drive unit. For example, the notification unit 24 displays the maintenance information in a display panel (not shown) of the control device 2, or outputs sound corresponding to content of the maintenance information from the control device 2.

For example, in case where the backlash amount is larger than a predetermined threshold, the notification unit 24 notifies maintenance information indicating that it is time to replace the reducer of the target drive unit. In case where the backlash amount is equal to or less than the predetermined threshold, the notification unit 24 predicts the time to replace the reducer of the target drive unit, and notifies the maintenance information indicating the predicted time to replace. For example, the notification unit 24 calculates an increase speed of the backlash amount from operation time of the robot mechanism 1 and the current backlash amount, calculates remaining operation time for the backlash amount to reach the predetermined threshold in case where it is assumed that the backlash amount increases at the calculated increase speed, and predicts the time to replace from the remaining operation time.

In case where the backlash amount sharply increases, the notification unit 24 notifies maintenance information indicating the sharp increase of the backlash amount. The sharp increase of the backlash amount is caused by, for example, collision of the robot mechanism 1 with a peripheral object. It is determined whether or not the backlash amount sharply increases, for example, depending on whether a difference between the previously measured backlash amount and the presently measured backlash amount is not less than a predetermined amount.

Next, description will be made as to an operation of the robot 10. The control unit 22 controls the robot mechanism 1 to execute the inspection operations of the reducers 14b, 15b, and 16b of the target drive units 14, 15, and 16 in order in accordance with the inspection programs 21a, 21b, and 21c. In the inspection operation of the reducer 14b, the control unit 22 controls the servomotors 11a to 16a and operates the robot mechanism 1 to dispose the tool 8 at the via-position P2, and subsequently, the control unit controls the servomotor 14a and rotates the fourth joint J4 so that the tool 8 approaches from the via-position P2 to the start position P1. Next, the control unit 22 transmits, to the servomotor 14a, control command to rotate as much as the predetermined rotation angle, and rotates only the fourth joint J4, to move the tool 8 from the start position P1 toward the object M and press the tool 8 onto the object M. Next, the control unit 22 controls the servomotor 14a and rotates the fourth joint J4 in reverse, to separate the tool 8 from the object M.

During execution of the above inspection operation, the backlash calculation unit 23 monitors the current value of the servomotor 14a, and the maximum value of the current value is detected. Next, the backlash calculation unit 23 calculates the backlash amount of the gear of the reducer 14b from the maximum value of the current value. Next, the notification unit 24 notifies the operator of the maintenance information based on the backlash amount of the gear of the reducer 14b. Subsequently to the inspection operation of the reducer 14b, the inspection operations of the reducer 15b and the reducer 16b are similarly performed, and the operator is notified of the maintenance information based on the backlash amounts of the gears of the reducers 15b and 16b.

The operator can plan preventive maintenance of the reducers 14b, 15b, and 16b based on the maintenance information notified by the notification unit 24. For example, in case where the operator is notified of the maintenance information indicating that it is time to replace the reducer 14b, the operator recognizes that the backlash amount of the reducer 14b increases up to the predetermined threshold or more, and replaces the reducer 14b with new one before a position of the tool 8 becomes unstable. In case where the operator is notified of the maintenance information indicating the predicted time to replace the reducer 14b, the operator makes a schedule till the replacement time to replace the reducer 14b. In case where the operator is notified of the maintenance information indicating the sharp increase of the backlash amount, the operator recognizes that the backlash amount of the reducer 14b sharply increases for some reason, and replaces the reducer 14b with the new one as required.

Thus, according to the present embodiment, the inspection operations of the reducers 14b, 15b, and 16b of the drive units 14, 15, and 16 are periodically executed, the backlash amounts of the gears of the reducers 14b, 15b, and 16b are measured in the inspection operations, and the operator is notified of the maintenance information corresponding to the backlash amounts by the notification unit 24. The operator can recognize the maintenance required for the respective reducers 14b, 15b, and 16b based on the maintenance information, and can plan the preventive maintenance of the reducers 14b, 15b, and 16b before a position of the tip of the robot mechanism 1 and the position of the tool 8 become unstable.

Furthermore, according to the present embodiment, the above predetermined inspection operation is executed by the robot mechanism 1, so that the backlash amount can be measured based on the current values of the servomotors 14a, 15a and 16a during the inspection operations without using any special devices. Additionally, according to the present embodiment, the inspection programs 21a, 21b, and 21c are prepared in the storage unit 21, so that the inspection operations of the reducers 14b, 15b, and 16b can be executed by the robot mechanism 1, without preparing any programs by the operator.

In case where the gears are used in a plurality of drive units, the backlash amount of the gear of the target drive unit calculated by the backlash calculation unit 23 may be influenced by the backlash of the gear of the other drive unit. Therefore, it is preferable that the control unit 22 controls the robot mechanism 1 to execute the above predetermined inspection operation in a state where the robot mechanism 1 is disposed with the inspecting posture with which the backlash amount of the gear of the target drive unit is hard to be influenced by the backlash of the gear of the drive unit other than the target drive unit.

FIG. 1, FIG. 2 and FIG. 3 show examples of inspecting postures of the robot mechanism 1 in the inspection operations of the reducers 14b, 15b, and 16b. Note that as described above among three reducers 11b, 12b, and 13b on the proximal side, at least the reducer 11b is the precision reducer with no or almost no backlash. Therefore, the measurements of the backlash amounts of the reducers 14b, 15b, and 16b are not influenced by the backlash of the reducer 11b.

In each of the inspecting postures of FIG. 1, FIG. 2 and FIG. 3, the first arm 5 is disposed with a posture with which gravity torque due to gravity acting on the first arm 5 acts on the second joint J2, and the second arm 6 is disposed with a posture with which gravity torque acting on the second arm 6 acts on the third joint J3. In such a posture, in the reducer 12*b* for the second joint J2, the tooth surfaces of the gears come in contact with each other on one side in the gear rotating direction, and the backlash is formed only on the other side in the gear rotating direction. Similarly, due to the gravity acting on the second arm 6, in the reducer 13*b* for the third joint J3, the tooth surfaces of the gears come in contact with each other on one side in the gear rotating direction, and the backlash is formed only on the other side in the gear rotating direction. Therefore, in the inspection operation, the target joint J4, J5 or J6 can be rotated without being influenced by the backlashes of the gears of the reducers 12*b* and 13*b*.

Furthermore, in each of the inspecting postures of FIG. 1, FIG. 2 and FIG. 3, among three joints J4, J5 and J6 on the tip side, the axis of the target joint is disposed in the vertical direction, and the axes of the other two joints are parallel to the direction that is orthogonal to the axis of the target joint. Specifically, in FIG. 1, the fourth axis A4 is disposed in the vertical direction, and the fifth axis A5 and the sixth axis A6 are parallel to the direction that is orthogonal to the fourth axis A4. In FIG. 2, the fifth axis A5 is disposed in the vertical direction, and the fourth axis A4 and the sixth axis A6 are parallel to the direction that is orthogonal to the fifth axis A5. In FIG. 3, the sixth axis A6 is disposed in the vertical direction, and the fourth axis A4 and the fifth axis A5 are parallel to the direction that is orthogonal to the sixth axis A6. In such a posture, a moving direction of the tool 8 by the rotation of the other two joints is orthogonal to a moving direction of the tool 8 by the rotation of the target joint. Therefore, in the inspection operation, the target joint can be rotated without being influenced by the gear backlashes of the reducers of the other two joints.

In the above embodiment, the backlash amounts calculated by the backlash calculation unit 23 may be stored in time series in the storage unit 21. According to this configuration, time series data of the backlash amounts of the respective reducers 14*b*, 15*b*, and 16*b* are generated in the storage unit 21. The time series data of the backlash amounts is effective for the preventive maintenance of the reducers 14*b*, 15*b*, and 16*b*.

For example, in a fitting operation of fitting the workpiece gripped with the tool 8 into a part, a defect that the workpiece suddenly does not fit into the part may occur. One of causes for such a disadvantage is the sharp increase of the backlash amount of the reducer 14*b*, 15*b* or 16*b*. The operator confirms whether or not the backlash amount of the reducer 14*b*, 15*b* or 16*b* sharply increases, with reference to the time series data of the backlash amounts stored in the storage unit 21, so that it can be determined whether or not the cause for the defect is in the reducer 14*b*, 15*b* or 16*b*.

Figure 9:
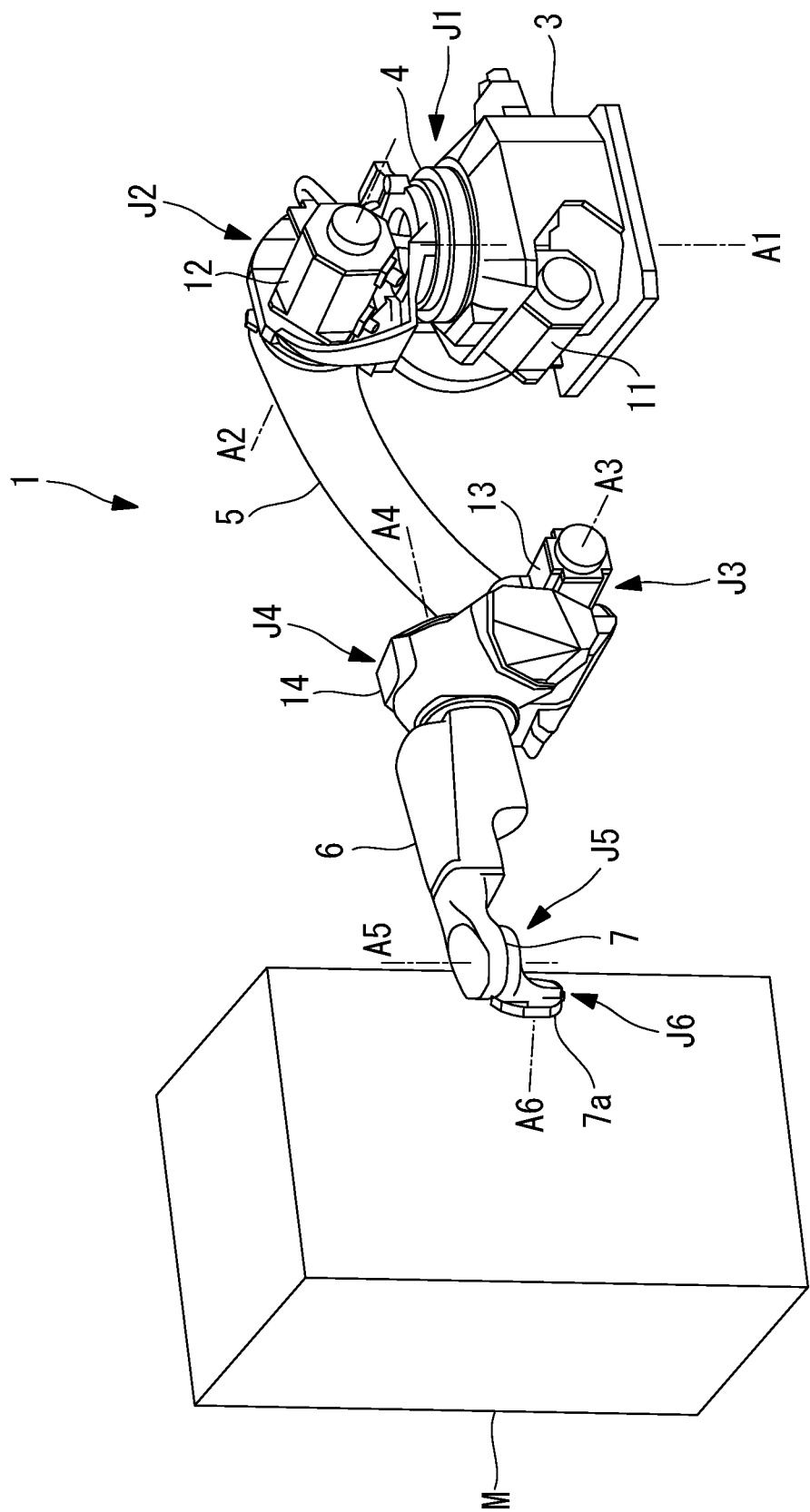
FIG. 9 is a view explaining an example of an inspection operation of the robot of FIG. 1 in case where any tools are not used.

In the above embodiment, it has been described that in the inspection operation, the tool 8 is pressed onto the object M, but alternatively, as shown in FIG. 9, the wrist unit 7 at the tip of the robot mechanism 1 may be pressed onto the object M. Thus, the wrist unit 7 is pressed directly onto the object M. Also, in this case, the backlash amount can be calculated based on the maximum value of the current values of the servomotors 14*a*, 15*a* and 16*a* in the same manner as in the case where the tool 8 is pressed onto the object M.

In the above embodiment, the notification unit 24 determines the content of the maintenance information to be notified to the operator, based on the backlash amount calculated by the backlash calculation unit 23. Alternatively, the content of the maintenance information to be notified to the operator may be determined based on the maximum value of the current value of the servomotor 14*a*, 15*a* or 16*a* during the predetermined inspection operation. For example, the notification unit 24 may monitor the current value of the servomotor 14*a*, 15*a* or 16*a* of the target joint during the predetermined inspection operation, detect the maximum value of the current value, and notify the maintenance information based on the maximum value. In this case, the backlash calculation unit 23 does not necessarily have to be provided in the robot 10.

In the above embodiment, it has been described that the predetermined object is the object M installed around the robot mechanism 1, but alternatively, the predetermined object may be a part of the robot mechanism 1. According to this configuration, the inspection operation can be executed even in case where any structures suitable for the inspection operation are not present around the robot mechanism 1.

Figure 10:
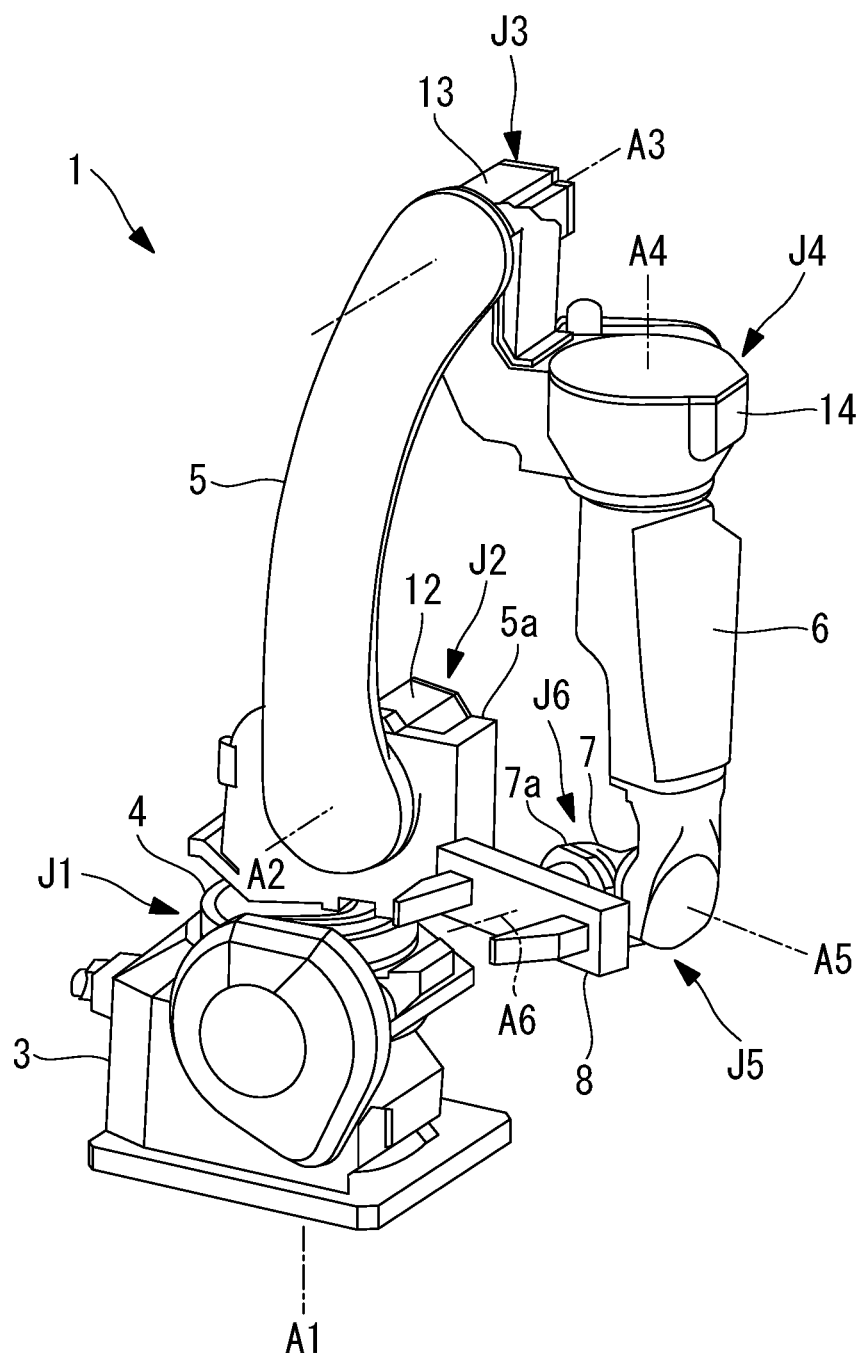
FIG. 10 is a view explaining another example of the inspection operation of the drive unit for the fourth joint.
Figure 11:
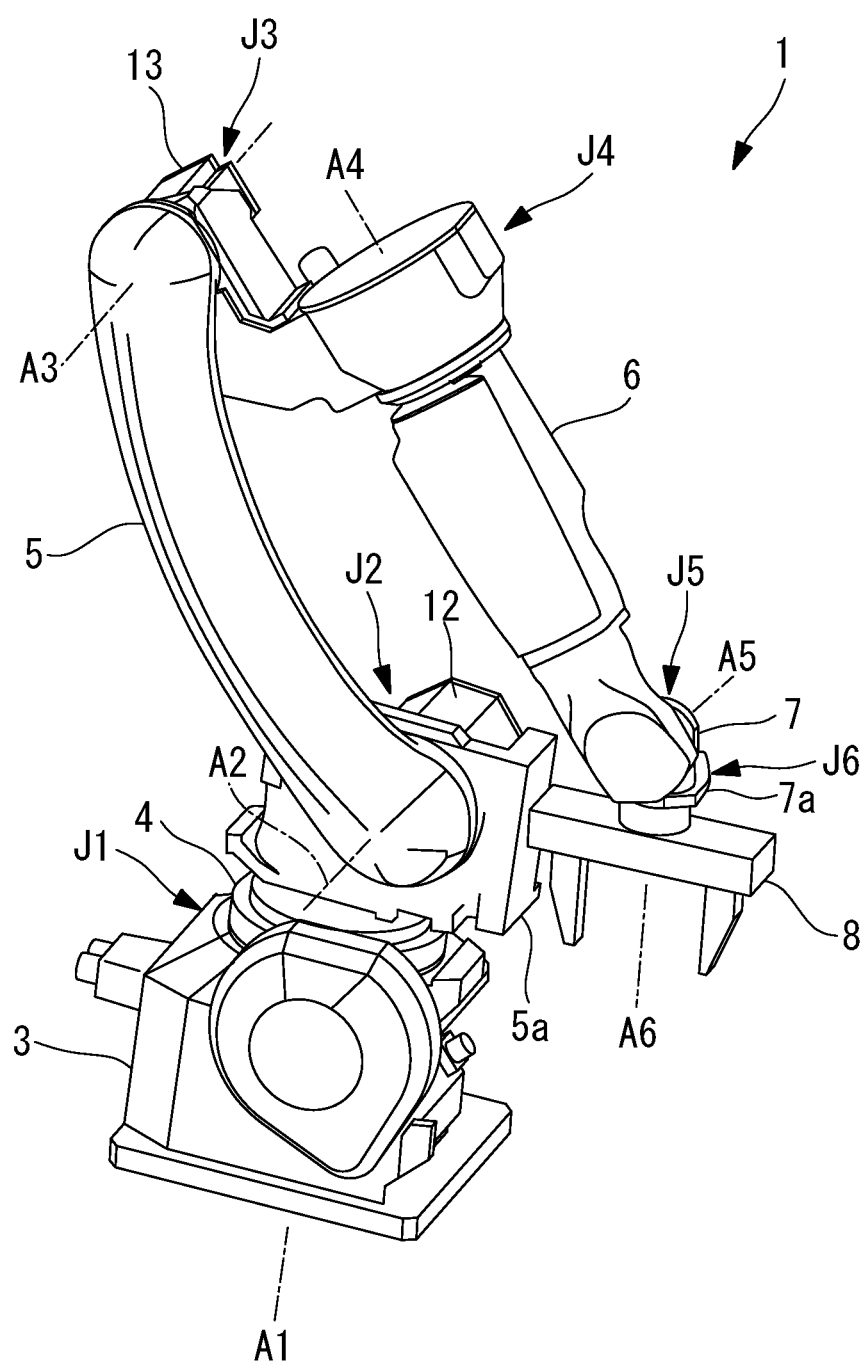
FIG. 11 is a view explaining another example of the inspection operation of the drive unit for the fifth joint.
Figure 12:
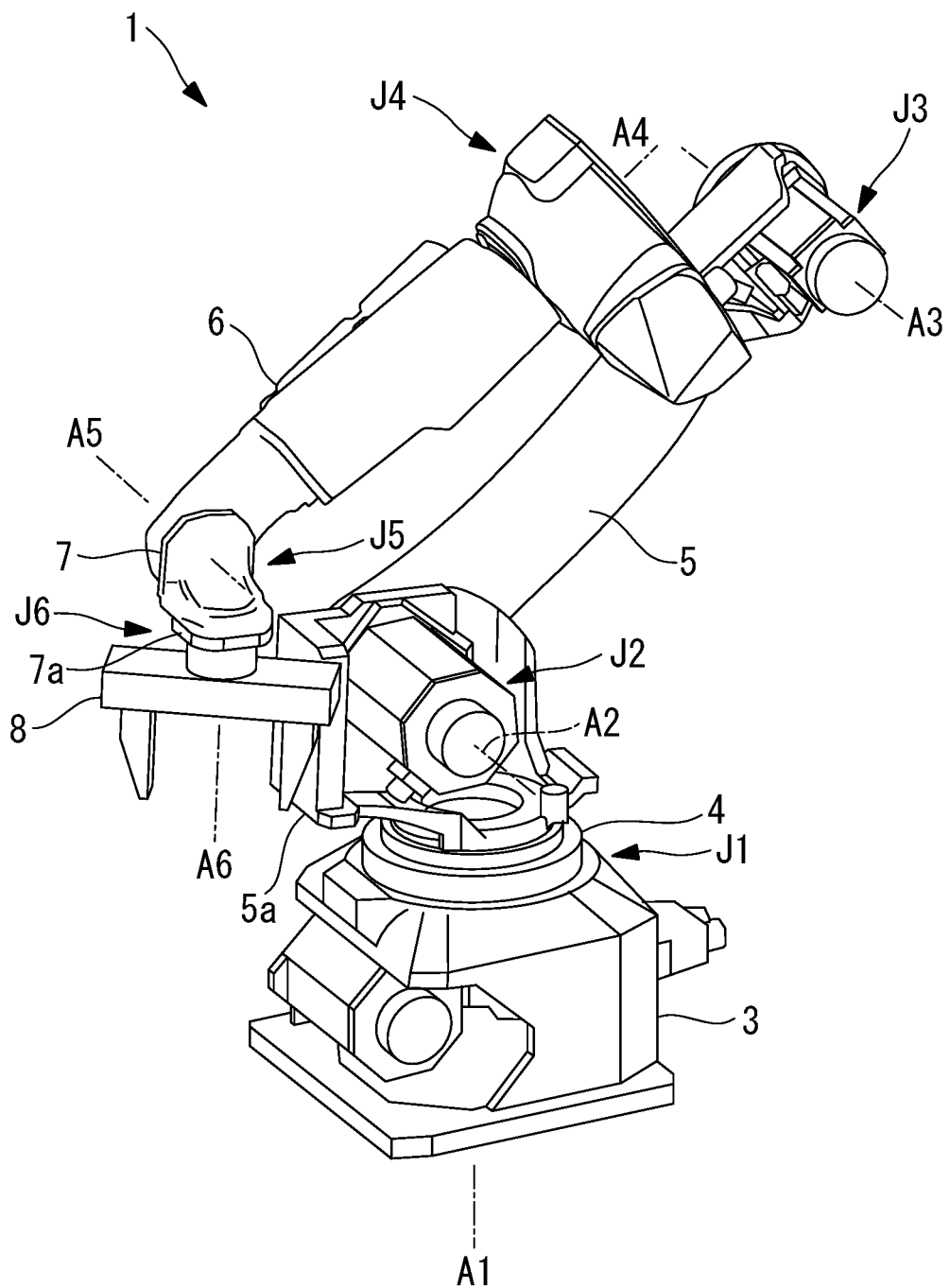
FIG. 12 is a view explaining another example of the inspection operation of the drive unit for the sixth joint.

FIG. 10, FIG. 11 and FIG. 12 show examples of the inspection operation of the reducers 14*b*, 15*b*, and 16*b* in case where a part of the robot mechanism 1 is for use as the predetermined object. In FIG. 10, FIG. 11 and FIG. 12, the robot mechanism 1 is disposed with the inspecting posture. In the inspection operation shown in FIG. 10 to FIG. 12, the tool 8 is pressed onto a proximal end of the second arm 6. At the proximal end of the second arm 6, a tough member 5*a* that provides a surface onto which the tool 8 is to be pressed may be provided.

In the above embodiment, it has been described that the backlash amount calculated by the backlash calculation unit 23 is for use in the preventive maintenance of the gear reducers 14*b*, 15*b*, and 16*b*. Alternatively, or additionally, the backlash amount may be for use in position compensation of the tool 8. The larger the backlash amount of the reducer 14*b*, 15*b* or 16*b* is, the larger an error in position of the tool 8 becomes. The control unit 22 may calculate a compensation value based on the backlash amount, and transmit, to the servomotor, control command compensated with the calculated compensation value.

In the above embodiment, it has been described that the backlash calculation unit 23 calculates the backlash amount from the current value, but alternatively, the backlash amount may be calculated from another piece of information associated with the current value. For example, the backlash calculation unit 23 may calculate the backlash amount from a disturbance value. The disturbance value is a difference between a command value of input current of the servomotor and an actually measured value of current. There is also a correlation between the backlash amount and the disturbance value, and hence, the backlash can be calculated based on the disturbance value.

In the above embodiment, it has been described that the robot mechanism 1 is the 6-axis vertical articulated robot, but alternatively, the robot mechanism 1 may be another type of industrial robot. For example, the robot mechanism 1 may be another axis number vertical articulated robot, a parallel link robot, or the like.

The invention claimed is:

1. A robot comprising:
   a robot mechanism; and
   a controller,
   wherein the robot mechanism comprises:
      a plurality of drive units; and
      a plurality of joints each of which is associated with one of the plurality of drive units,
   wherein each of the plurality of drive units comprises:

a motor that is controlled by the controller; and a plurality of gears that mesh with each other and that are operated for outputting rotational force of the motor to a joint associated therewith, and wherein when a predetermined time comes, the controller is configured to:

select one of the plurality of drive units as a target drive unit;

control the motor of the target drive unit to operate the plurality of gears of the target drive unit so that backlash is formed in the plurality of gears;

in a state where the backlash is formed, control the motor of the target drive unit to rotate, as much as a predetermined rotation angle, a target joint which is associated with the target drive unit so that a tip of the robot mechanism or a tool connected to the tip is pressed onto an object fixed to a predetermined position;

while the target joint is rotated as much as the predetermined rotation angle, detect a current of the motor of the target drive unit; and calculate an amount of the backlash based on a maximum value of the detected current observed while the target joint is rotated as much as the predetermined rotation angle.

2. The robot according to claim 1, wherein the controller is configured to output information based on the calculated amount of the backlash.

3. The robot according to claim 1, wherein the robot mechanism is a 6-axis vertical articulated robot.

4. The robot system according to claim 3, wherein the plurality of drive units are drive units that are associated with three joints on a tip side among six joints of the 6-axis vertical articulated robot.

5. The robot according to claim 4, wherein when the predetermined time comes, before controlling the target drive unit, the controller is configured to control the robot mechanism so as to have a predetermined posture that minimizes backlash influences of two drive unit other than the target drive unit.

6. The robot according to claim 5, wherein in the predetermined posture, an axis of the target joint is disposed in a vertical direction, and among the three joints, axes of two joints other than the target joint are parallel to a direction that is orthogonal to the axis of the target joint.

7. The robot according to claim 1, wherein the controller is configured to store time series data of the calculated amount of the backlash and output the stored time series data.

8. The robot according to claim 1, wherein the object is a part of the robot mechanism.

* * * * *